(12) United States Patent
Elhardt et al.

(10) Patent No.: US 7,448,191 B2
(45) Date of Patent: Nov. 11, 2008

(54) MOWER DECK LIFT SYSTEM WITH TRANSPORT LOCK

(75) Inventors: Paul M. Elhardt, Charlotte, NC (US); Franklin P. Lewis, Fuquay-Varina, NC (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/674,840

(22) Filed: Feb. 14, 2007

(65) Prior Publication Data

US 2008/0190087 A1 Aug. 14, 2008

(51) Int. Cl.
*A01D 34/00* (2006.01)
(52) U.S. Cl. ...................................................... 56/17.1
(58) Field of Classification Search .................. 56/14.9, 56/15.9, 17.1, DIG. 22, 14.7, 15.7, 15.8, 56/16.3, 16.7, DIG. 1, 320.1
See application file for complete search history.

(56) References Cited

U.S. PATENT DOCUMENTS

| | | | |
|---|---|---|---|
| 4,120,136 A | 10/1978 | Rose | |
| 5,138,825 A | 8/1992 | Trefz et al. | |
| 5,351,467 A * | 10/1994 | Trefz et al. | 56/16.3 |
| 5,816,033 A | 10/1998 | Busboom et al. | |
| 5,946,893 A | 9/1999 | Gordon | |
| 6,122,903 A * | 9/2000 | Hayashi et al. | 56/15.8 |
| 6,427,430 B1 | 8/2002 | Swartzendruber | |
| 6,494,028 B2 | 12/2002 | Moore | |
| 6,588,188 B2 | 7/2003 | Dennis | |
| 6,658,831 B2 * | 12/2003 | Velke et al. | 56/14.7 |
| 6,837,032 B1 | 1/2005 | Swartzendruber | |
| 2002/0035825 A1 | 3/2002 | Swartzendruber | |
| 2002/0059788 A1 * | 5/2002 | Velke et al. | 56/14.7 |
| 2006/0090442 A1 | 5/2006 | Komiya et al. | |
| 2007/0169456 A1 | 7/2007 | Komorida et al. | |

* cited by examiner

*Primary Examiner*—Árpád Fábián-Kovács

(57) ABSTRACT

A mower deck lift system includes a transport lock for locking the mower deck in a transport position, a height of cut control knob connected to a height of cut cam having a plurality of mower deck height settings, and a height of cut pawl movable to engage or disengage the height of cut cam at each mower deck height setting. A transport lock crank may be locked in a transport position preventing the height of cut pawl from engaging the height of cut cam, or unlocked to allow the height of cut pawl to engage the height of cut cam. A transport lock indicator integrated into the height of cut control knob is connected to the transport lock crank, and is movable with the transport lock crank between the transport position and an unlocked position.

7 Claims, 6 Drawing Sheets

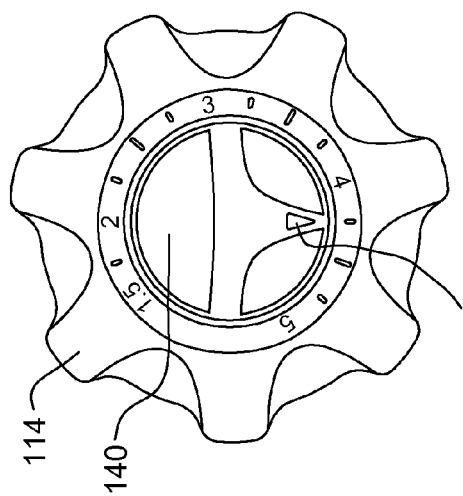
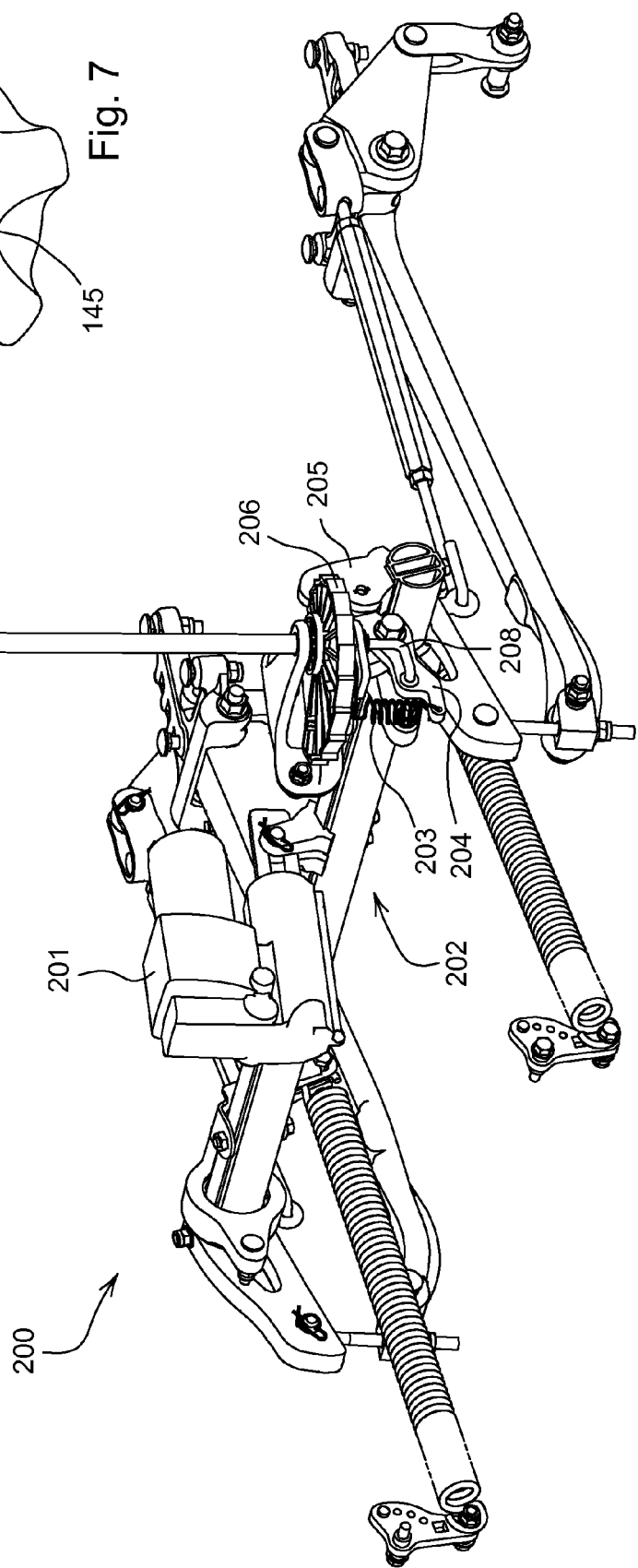

MOWER DECK LIFT SYSTEM WITH TRANSPORT LOCK

FIELD OF THE INVENTION

The present invention relates generally to height adjustable mower cutting decks, and specifically to a mower deck lift system with a transport lock to hold the mower deck at a transport position.

BACKGROUND

Vegetation cutting implements such as mower cutting decks are typically carried by self propelled vehicles or lawn tractors having mechanisms allowing adjustment of the decks between a range of heights above ground level. Ordinarily, the range extends between a position at or below the lowest available cut height to a position at or above the highest available cut height. Adjustment to a position below the cut height range is frequently preferred for ease in removal of the deck from the vehicle because the deck is that much closer to the ground surface. Adjustment above the cut height range may permit the deck to clear obstacles encountered while traveling across the ground. This maximum height position may be referred to as the deck transport position.

Adjustment of the cutting deck height may be accomplished by various mechanisms including hand-operated levers and bars positioned in the vicinity of the mower's operator station. The mechanisms require an operator to either push or pull on a lever or bar to adjust the deck height. Pedal actuated mechanisms also are used to adjust cutting deck height relative to the mower frame. Pedal actuated mechanisms may include a handle or other hardware which automatically locks the deck in a given position upon full actuation of the pedal. U.S. Pat. No. 4,120,136 for "Implement Supporting and Lifting Linkage"; U.S. Pat. No. 5,138,825 for "Riding Mower Having a Pedal Operated Height Adjustment Mechanism, Air Assisted Discharge, and Improved Hydrostatic Shift Linkage"; U.S. Pat. No. 5,187,925 for "Mower Deck Lift System Handle Mechanism"; U.S. Pat. No. 5,351,467 for "Height Adjustment Mechanism for Riding Mower Cutting Deck"; U.S. Pat. No. 5,381,648 for "Mower Deck Height Adjustment Mechanism"; U.S. Pat. No. 5,797,252 for "Height of Cut Adjustment Mechanism"; U.S. Pat. No. 5,816,033 for "Riding Lawn Mower Including a Mower Deck Height Control Mechanism"; U.S. Pat. No. 5,946,893 for "Lawn Mower Having Cutter Deck Motion Coupled to Mower Wheel Motion"; U.S. Pat. No. 6,427,430 for "Pedal Lift System for Lawn Tractor Mower Deck"; U.S. Pat. No. 6,494,028 for "Deck Lift Apparatus for Riding Mower"; U.S. Pat. No. 6,588,188 for "Foot Lift Cutter Deck Mower Units" and U.S. Pat. No. 6,837,032 for "Pedal Actuated Height Adjustment Mechanism for a Mower Cutting Deck" provide examples of mower deck lifting mechanisms.

A mower deck lift system is needed that provides convenient visual feedback to the operator if the transport lock is engaged. A mower deck lift system is needed that allows the operator to quickly and simply elect whether or not to engage the transport lock. A mower deck lift system is needed that maintains the mower deck at the same height of cut setting after the mower deck is raised to the transport position.

SUMMARY OF THE INVENTION

A mower deck lift system with a transport lock provides convenient visual feedback to the operator if the transport lock is engaged. The mower deck lift system allows the operator to quickly and simply elect whether or not to engage the transport lock. The mower deck is maintained at the same height of cut setting after the mower deck is raised to the transport position.

The mower deck lift system includes a height of cut control knob movable to a plurality of positions, each position corresponding to a cutting height. A height of cut pawl is attached to the height of cut control knob and pivots to engage a height of cut cam to hold the mower deck at each cutting height set with the control knob. A transport lock crank is biased to a transport lock position preventing the height of cut pawl from engaging the height of cut cam, and a transport lock indicator connected to the transport lock crank provides visual feedback to the operator.

BRIEF DESCRIPTION OF THE DRAWINGS

FIG. 6 is a perspective view of a second embodiment of a mower deck lift system operated with an electro-hydraulic actuator, with a transport lock that is unlocked.

FIG. 7 is a top view of an embodiment of a height of cut control knob and transport lock indicator.

DESCRIPTION OF PREFERRED EMBODIMENTS

Figure 1:
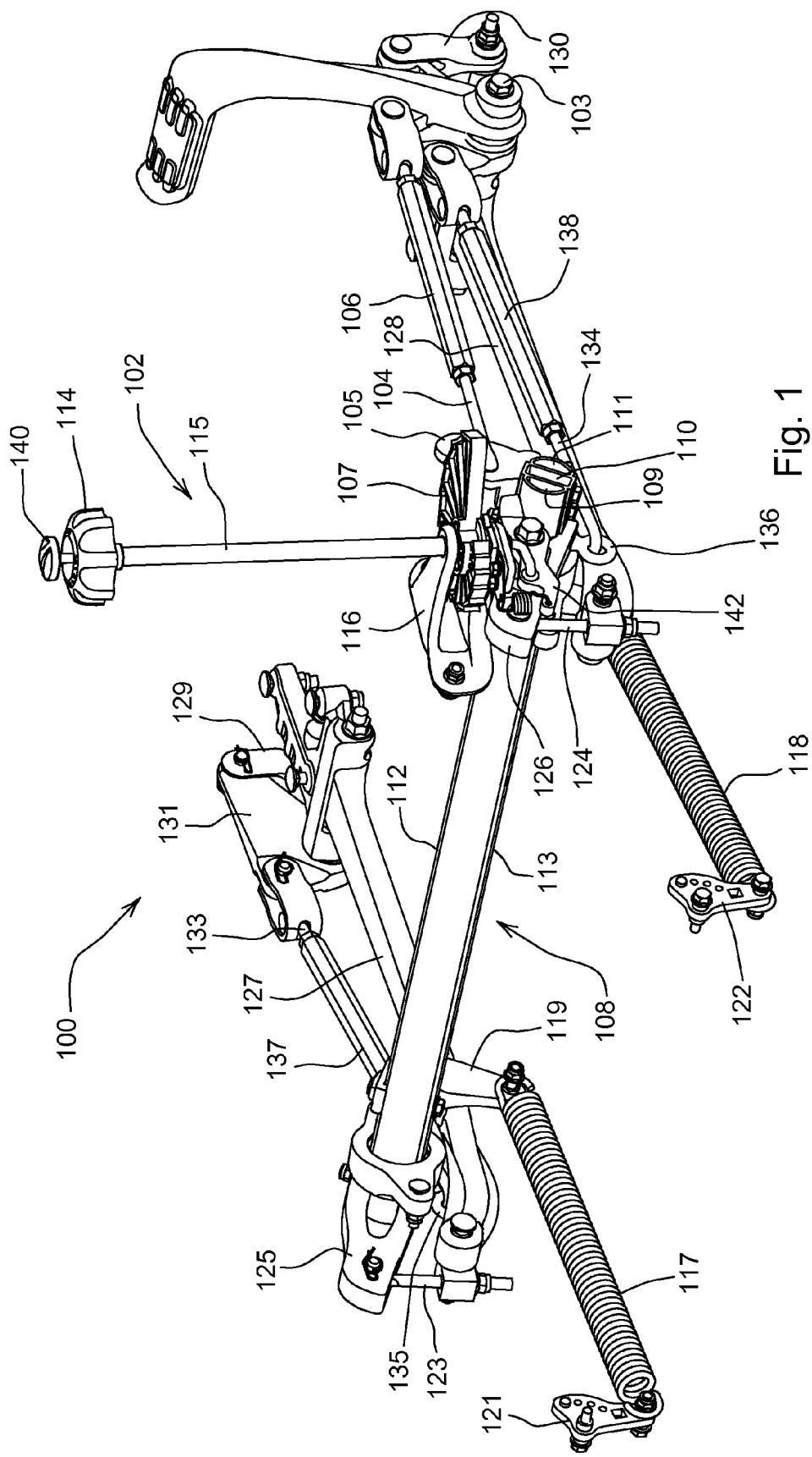
FIG. 1 is a perspective view of a first embodiment of a mower deck lift system operated with a foot pedal, with a transport lock that is locked in the transport position.
Figure 2:
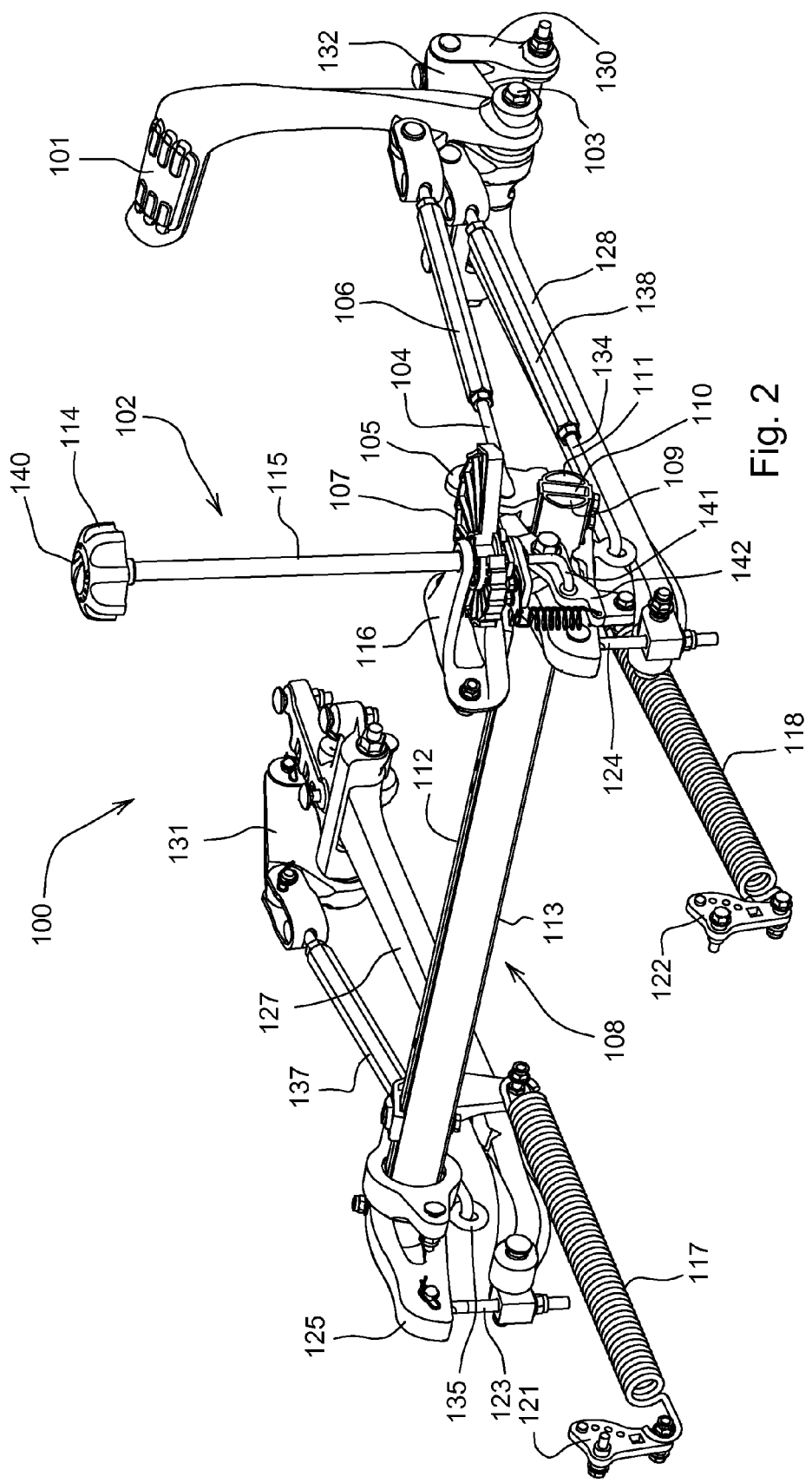
FIG. 2 is a perspective view of a first embodiment of a mower deck lift system operated with a foot pedal, with a transport lock that is unlocked.
Figure 3:
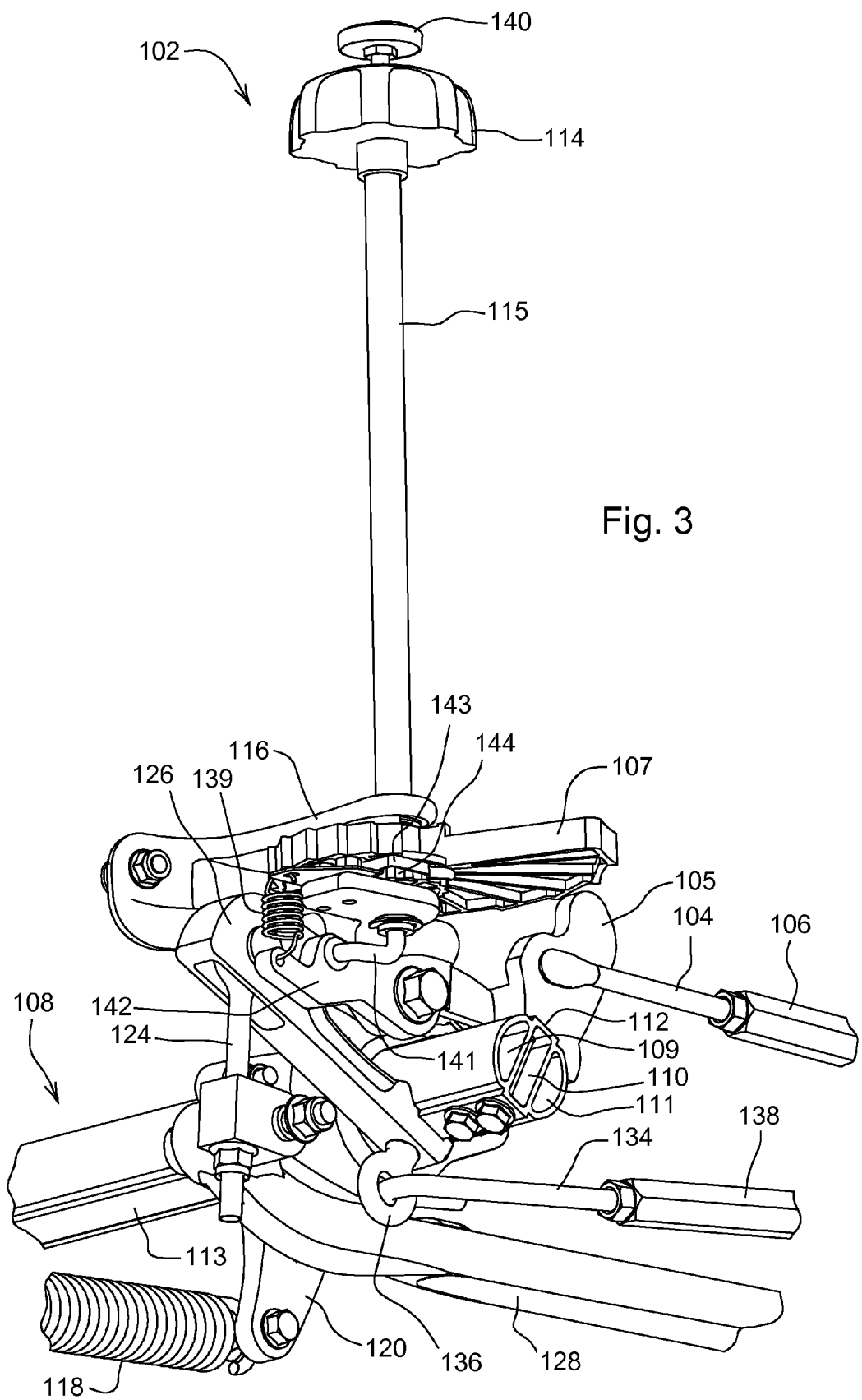
FIG. 3 is a perspective view of the first embodiment of the transport lock that is locked in the transport position.
Figure 4:
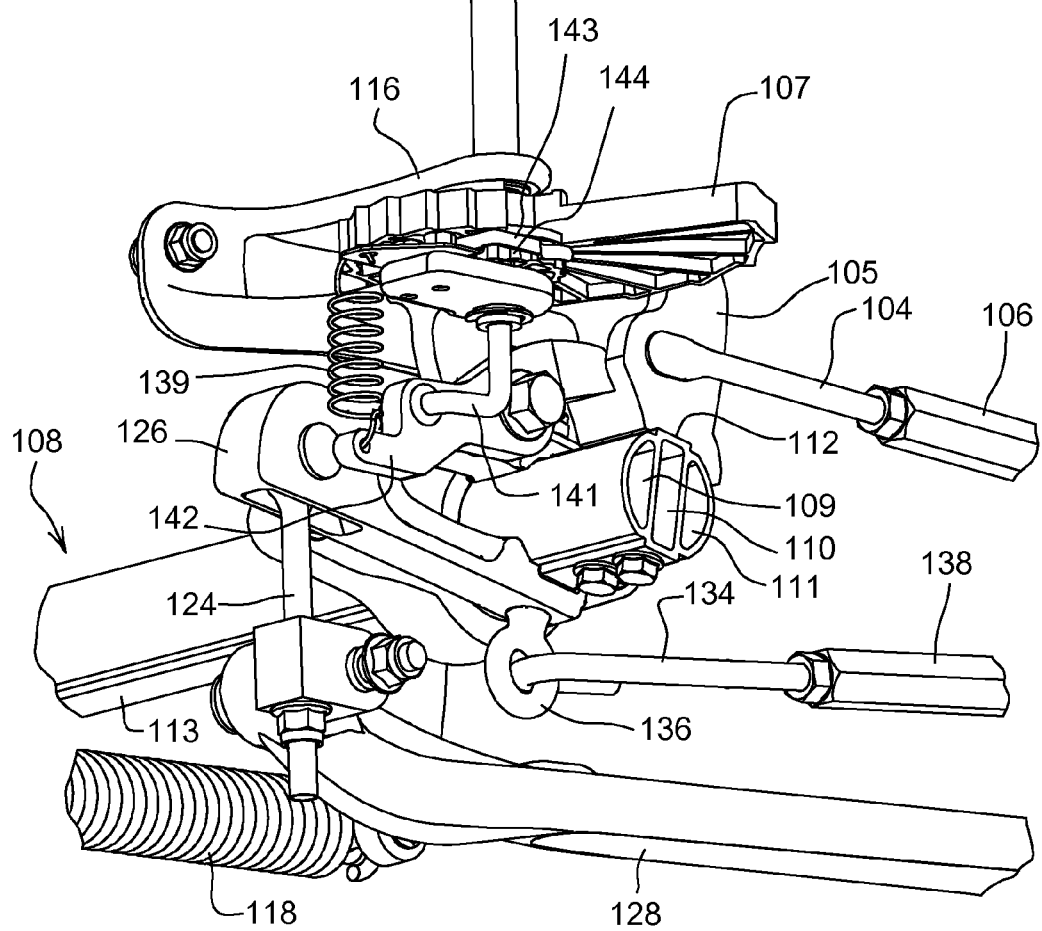
FIG. 4 is a perspective view of the first embodiment of the transport lock in the unlocked position.

In a first embodiment shown in FIGS. 1-4, mower deck lift system 100 may be operated with foot pedal 101 to raise and lower a mower deck. The operator may raise the mower deck by depressing the foot pedal, and lower the mower deck by releasing the foot pedal. The operator also may use transport lock 102 to lock the mower deck in the transport position once the mower deck is raised and the foot pedal is released.

In one embodiment, foot pedal 101 may be pivotably mounted on stationary pivot axis 103. Rod 104 may connect the foot pedal to height of cut pawl 105. Turnbuckle 106 may be used to adjust the length of rod 104. The height of cut pawl engages a step on height of cut cam 107 corresponding to a selected cutting height. If the operator depresses the foot pedal, the height of cut pawl disengages the height of cut cam.

In one embodiment, height of cut pawl 105 may be bolted to rockshaft 108. Depressing foot pedal 101 pivots the height of cut pawl and causes the rockshaft to turn on its longitudinal axis in a direction to raise the mower deck. Releasing the foot pedal allows the rockshaft to turn on its longitudinal axis in a direction to lower the mower deck, unless transport lock 102 is locked in the transport position.

In one embodiment, rockshaft 108 may be an extruded aluminum tube having a longitudinal axis that is transverse to the primary axis of a grass mowing machine. The rockshaft may have internal channels 109-11 and opposing external flat surfaces 112-13 for locating and positioning mounting bolts.

Several components may be bolted and removably attached to the rockshaft without welding. This can reduce assembly cost and simplify repair or replacement of components.

In one embodiment, mower deck lift system 100 may include height of cut control knob 114 that may be turned manually to any of a number of different cutting heights indicated or marked on the height of cut control knob. Tube 115 may connect the height of cut control knob to height of cut cam 107. The tube may be inserted through and supported by height of cut bracket 116 mounted to the frame of the grass mowing machine. Each step on the outer circumference of the height of cut cam corresponds to a selected cutting height.

In one embodiment, left and right deck lift assist springs 117-18 may bias rockshaft 108 to turn on its longitudinal axis in a direction tending to raise the mower deck. The deck lift assist springs may be used because the weight of the mower deck urges the rockshaft to turn in the opposite direction. The deck lift assist springs may be attached between left and right spring cranks 119-20 bolted to the rockshaft, and left and right stationary brackets 121-22 attached to the grass mowing machine frame.

In one embodiment, the rear of the mower deck may be attached to the deck lift mechanism with rear left and right deck hangers 123-24. The upper ends of the rear left and right deck hangers are connected to left and right deck lift cranks 125-26 bolted to rockshaft 108. The upper ends of the rear left and right deck hangers may have slots or eyes that are fastened to the deck lift cranks in such a manner that the rear of the mower deck can move up sufficiently to travel over an obstacle on the ground. The upper ends of the rear left and right deck hangers are attached to the deck lift cranks at positions between about three inches and about nine inches from the longitudinal axis of the rockshaft. The deck hangers may be configured to allow the mower deck to travel vertically about three inches to about five inches from the lowest and highest cut heights. The lower ends of the rear left and right deck hangers are fastened to the rear of the mower deck on its left and right sides. Drag links 127-28 may pivotably connect the rear left and right deck hangers to stationary pivot axis 103.

In one embodiment, the front of the mower deck may be attached to the mower deck lift system with front left and right deck hangers 129-30. The upper ends of the front left and right deck hangers are pivotably connected to left and right cranks 131-32 on stationary pivot axis 103, at positions between about three inches and about nine inches from the pivot axis. Rods 133-34 connect the left and right cranks to pins 135-36 which are bolted to rockshaft 108. The connection between rods 133-34 and pins 135-36 may include slots or eyes that are fastened in such a manner that the front of the mower deck can move up sufficiently if an obstacle is encountered. Turnbuckles 137-38 may be used to adjust the length of rods 133-34 to help level and/or adjust the mower deck position.

In one embodiment, mower deck lift system 100 can raise and lower a mower deck essentially vertically between a plurality of cutting heights from about 1½ inches to about 5 inches. At cutting heights within this range, the mower deck lift system can effectively limit front-to-back translation of the mower deck to under about 10 mm.

In one embodiment, the mower deck may be locked in the transport position automatically if the operator fully depresses foot pedal 101 to raise the mower deck to a maximum cut height such as 5 inches. Spring 139 biases the transport lock to the transport position, so that the mower deck automatically locks in the transport position. Once the operator releases the foot pedal while the transport lock is locked in the transport position, height of cut pawl 105 is prevented from moving back against height of cut cam 107.

In one embodiment, if the operator does not wish to lock the mower deck in the transport position (or wishes to release the mower deck from the transport position), he or she may unlock the transport lock by pressing down on transport lock indicator 140 with his or her hand. If the operator releases the foot pedal while the transport lock is unlocked, height of cut pawl 105 can move back against a step on height of cut cam 107, and the mower deck can descend to a specified cutting height. In an alternative embodiment (not shown), the transport lock may engage only if the operator presses down on the transport lock indicator or another button.

In one embodiment shown in FIG. 7, transport lock indicator 140 provides a visual indicator showing if the transport lock is locked in the transport position. The transport lock indicator may be integrated into height of cut control knob 114. The transport lock indicator may be at the center of the height of cut control knob and may include a pointer 145 to the height of cut settings listed on the height of cut control knob. Additionally, the transport lock indicator may move between a first position if the mower deck is locked in the transport position, and a second position if the mower deck is not locked in the transport position. For example, in the first position, the transport lock indicator may extend above the center of the height of cut control knob to indicate that the mower deck is locked in the transport position. In the second position, in which the mower deck is not locked in the transport position, the transport lock indicator may be at or near the top surface of the height of cut control knob.

In one embodiment, transport lock indicator 140 may be connected by wire form 141 to transport lock crank 142. The wire form may be inserted through tube 115. Spring 139 may urge the transport lock crank to pivot in a direction to engage or block height of cut pawl 105, preventing the height of cut pawl from engaging height of cut cam 107. The transport lock crank may be pivotably mounted to height of cut bracket 116.

In one embodiment, the mower deck may descend back to the same height of cut setting after it is raised and/or locked in the transport position, unless the operator turns height of cut knob 114. Leaf spring 143 may engage spring detent gear 144 to hold height of cut cam 107 at a previously specified height of cut. The spring detent gear may be attached to and/or integral with the height of cut cam.

Figure 5:
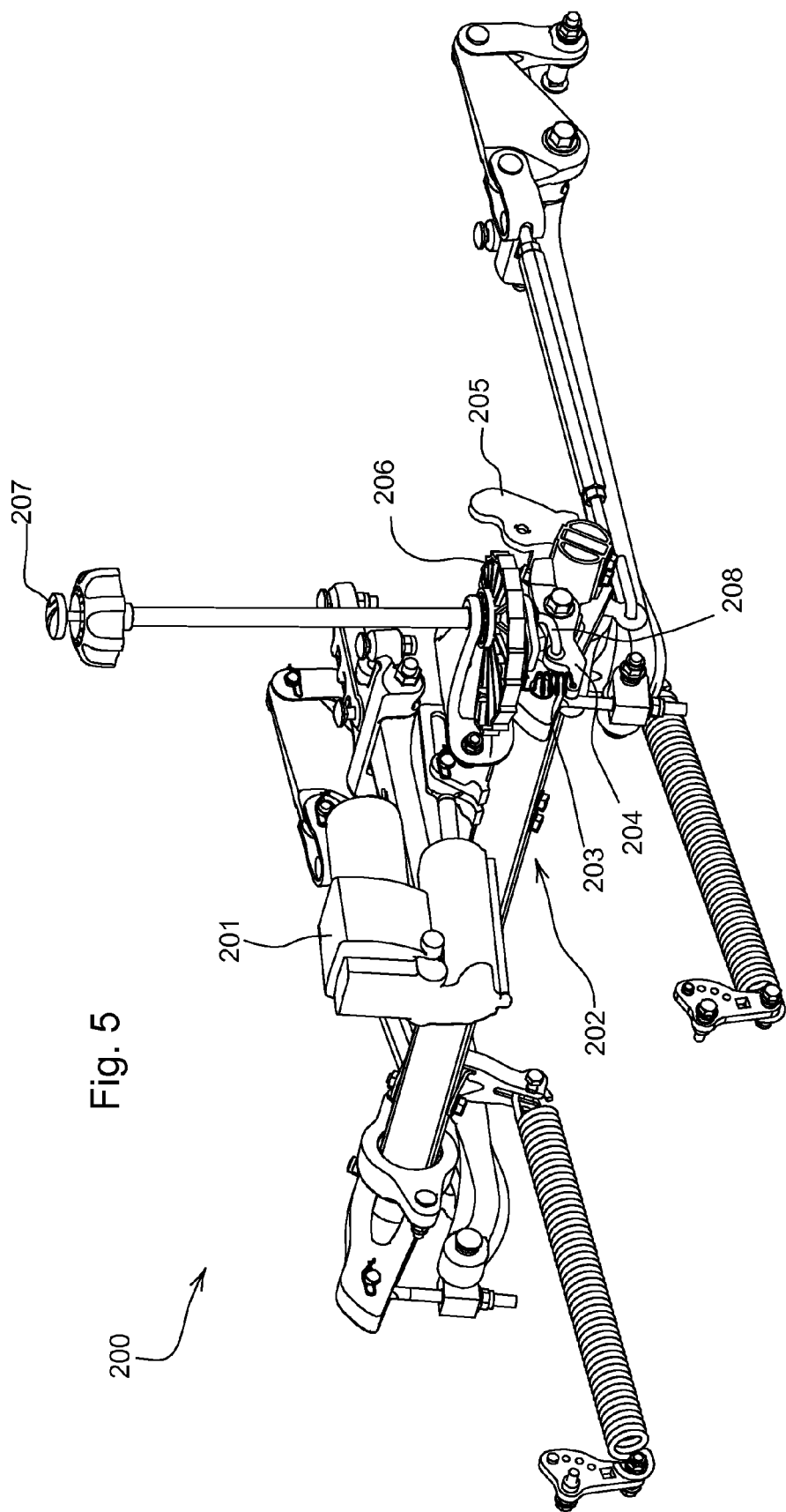
FIG. 5 is a perspective view of a second embodiment of a mower deck lift system operated with an electro-hydraulic actuator, with a transport lock that is locked in the transport position.

In a second embodiment shown in FIGS. 5-6, mower deck lift system 200 includes electro-hydraulic actuator 201 instead of a foot pedal. The hydro-electric actuator may be bolted to rockshaft 202, and may turn the rockshaft by operating a push button or other control. In all other respects, the mower deck lift system operates the same as the first embodiment, and has the same components and functions. If the hydro-electric actuator is used to turn the rockshaft to the transport position, the transport lock may be locked in the transport position. Spring 203 urges transport lock crank 204 to pivot in a direction to engage or block height of cut pawl 205, preventing the height of cut pawl from engaging height of cut cam 206. Transport lock indicator 207 may be connected to the transport lock crank by wire form 208. The electro-hydraulic actuator may be allowed to run for a maximum time, e.g., 5 to 15 seconds, to avoid overheating while the transport lock is locked in the transport position or unlocked.

Having described the preferred embodiment, it will become apparent that various modifications can be made without departing from the scope of the invention as defined in the accompanying claims.

The invention claimed is:

1. A mower deck lift system comprising:
   a height of cut control knob movable to a plurality of positions, each position corresponding to a cutting height;
   a height of cut pawl attached to the height of cut control knob and pivoting to engage a height of cut cam to hold the mower deck at each cutting height set with the control knob;
   a transport lock crank biased to a transport lock position preventing the height of cut pawl from engaging the height of cut cam; and
   a transport lock indicator connected between the transport lock crank and the height of cut control knob to provide a visual indicator on the knob if the mower deck is in the transport lock position without changing the cutting height position of the knob.

2. The mower deck lift system of claim 1 wherein the transport lock indicator extends from the height of cut control knob in the transport lock position.

3. The mower deck lift system of claim 1 wherein the transport lock indicator is movable to pivot the transport lock to an unlocked position.

4. The mower deck lift system of claim 1 wherein the height of cut control knob is attached to the height of cut pawl with a tube.

5. The mower deck lift system of claim 4 wherein the transport lock indicator is connected to the transport lock crank with a wire form extending through the tube.

6. The mower deck lift system of claim 1 wherein the mower deck is movable between a plurality of cutting heights while limiting front-to-back translation of the mower deck to under about 10 mm.

7. The mower deck lift system of claim 1 further comprising a plurality of cranks bolted to a hollow rockshaft.

* * * * *